March 18, 1958  K. A. BROWNE ET AL  2,827,283
AIR SPRING WITH DAMPING VALVE
Filed July 14, 1954  3 Sheets-Sheet 2

INVENTORS
KENNETH A. BROWNE
BY SERGEI G. GUINS
Hudson, Boughton,
Williams, David & Hoffman
ATTORNEYS

# United States Patent Office 2,827,283
Patented Mar. 18, 1958

2,827,283

AIR SPRING WITH DAMPING VALVE

Kenneth A. Browne, Lakewood, and Sergei G. Guins, Olmsted Falls, Ohio, assignors to The Chesapeake and Ohio Railway Company, Cleveland, Ohio, a corporation of Virginia Application July 14, 1954, Serial No. 443,258

5 Claims. (Cl. 267—65)

This invention relates to air spring apparatus of the kind frequently used for cushioning purposes between sprung and unsprung portions of vehicles.

As one of its objects, this invention aims to provide air spring apparatus of this kind which includes damping valve means for reducing or preventing periodic oscillation.

Another object is to provide such an air spring apparatus in which the damping valve means is located in passage means connecting the pressure chamber of a cylinder device with a reservoir and includes a valve member movable in an opening direction in response to the pressure of the fluid thereagainst.

Still another object is to provide air spring apparatus of the kind above mentioned in which the connecting passage includes an orifice portion relative to which the valve member is linearly movable axially of such orifice portion and in which the effective area of the orifice opening is a function of the linear movement of the valve member.

As another of its objects, this invention provides an improved air spring apparatus of the kind indicated above in which the orifice portion has a throat section and an adjacent tapered section whose transverse dimension increases progressively in a direction away from the throat section and in which the valve member cooperates with the wall of the tapered section in defining an annular valve opening whose area is a function of the linear movement of the valve member.

Additionally, this invention provides such an improved air spring apparatus in which spring means effective on the valve member urges the same toward an initial position adjacent the throat section of the orifice portion.

Other objects and advantages of the invention will be apparent in the accompanying drawings and in the following detailed description.

In such accompanying drawings forming a part of this specification:

Figure 6:
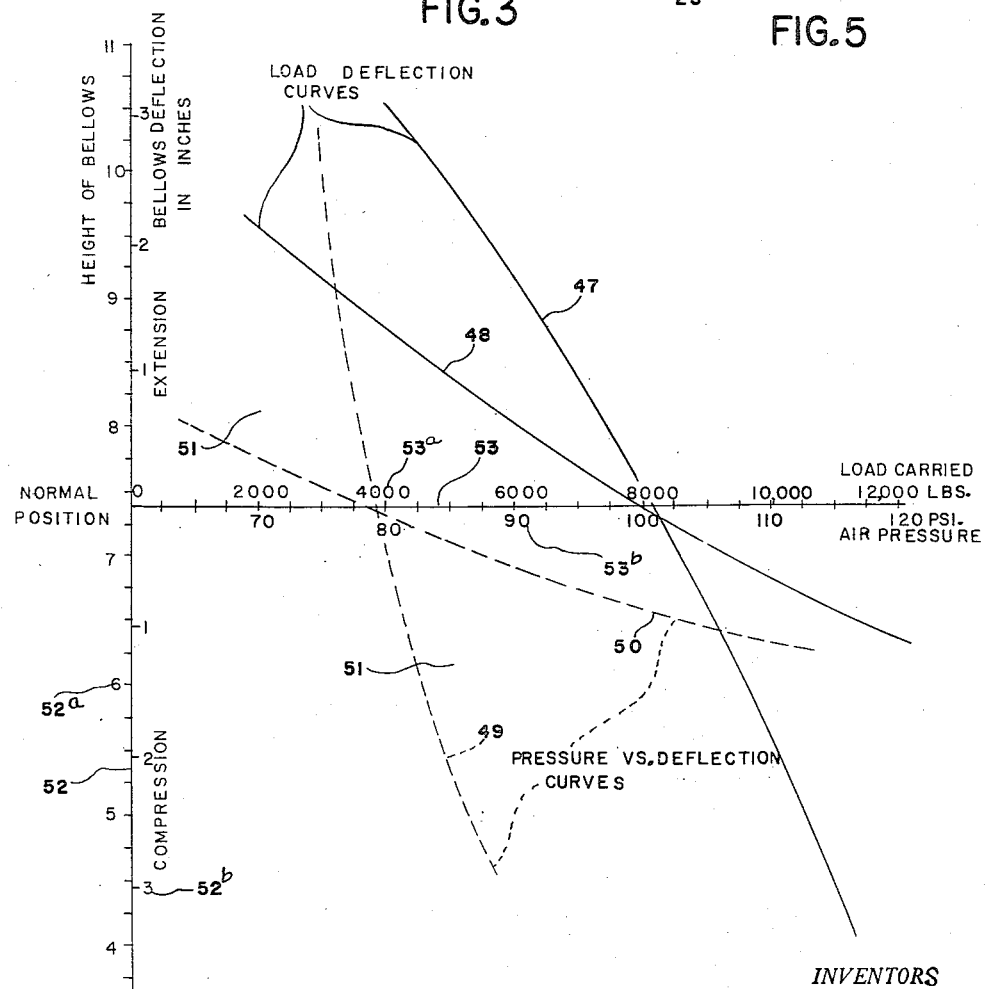
Figure 7:
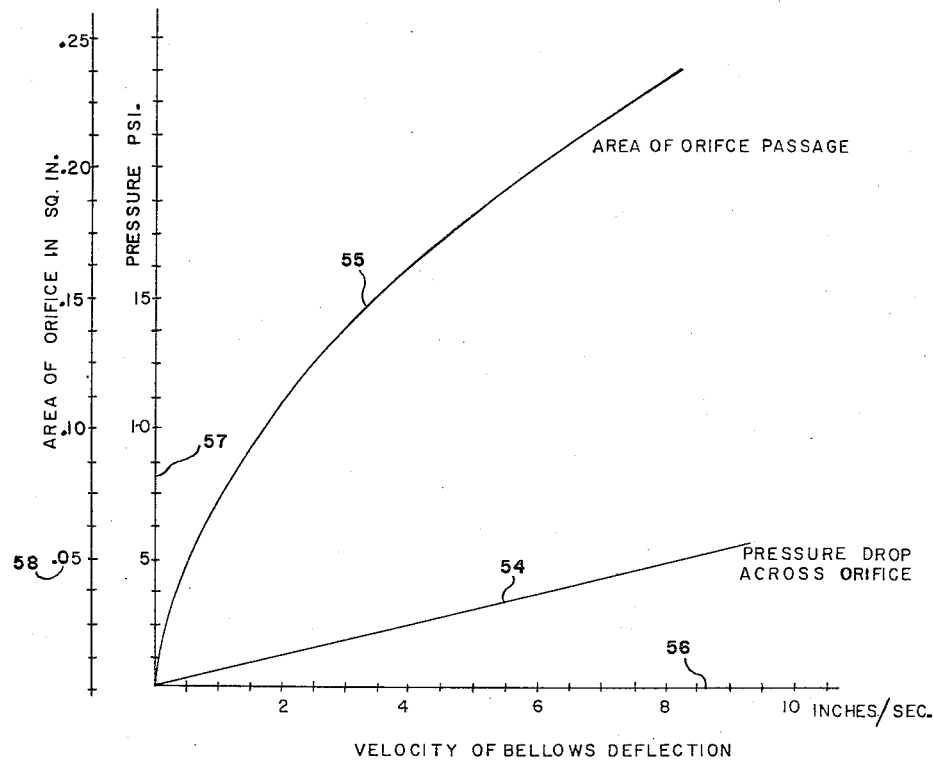
Figure 8:
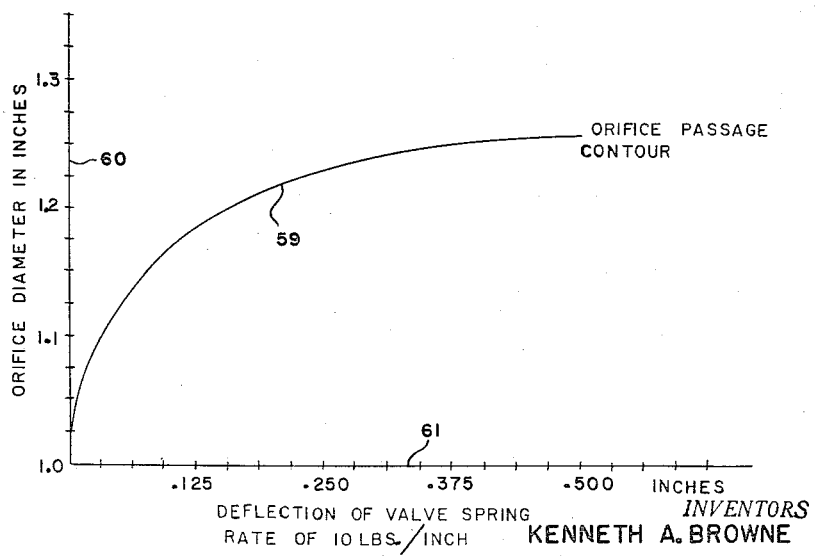

Figs. 6, 7, and 8 are diagrams illustrating various characteristics and operating functions of this air spring apparatus.

The drawings show this air spring apparatus 10 applied to vehicle structure 11 and comprising a cylinder device 12 having a pressure chamber 13 therein, a reservoir 14, and means connecting the cylinder device with the reservoir for the transfer of pressure fluid therebetween and including an oscillation damping valve 15.

The air spring apparatus 10 is applicable to various different kinds of vehicles, but the embodiment here illustrated is intended for railway car use, and the vehicle structure 11 is therefore represented as being that of a railway car. The cylinder device 12 is here shown as being a bellows 12a disposed in an upright relation between sprung and unsprung portions 16 and 17 of the vehicle. The vehicle portion 16 is here shown as being a portion of the frame or body of the vehicle and as being movable relative to the vehicle portion 17, the latter being here represented as a part of a wheeled truck or axle structure of the vehicle.

The bellows 12a comprises a flexible cylinder wall provided with a suitable number of annular convolutions 12b, in this instance two such convolutions. The upper end of the bellows 12a is secured to the plate member 18 of the vehicle portion 16 as by means of the clamping ring 19 and the lower end of the bellows is secured to the plate member 20 of the vehicle portion 17 as by means of the clamping ring 21. The pressure chamber 13 is in communication with the reservoir 14 through the damping valve 15 and through a conduit 22 extending between such reservoir and damping valve.

The air spring apparatus 10 is here shown as also having a charging connection represented by the conduit 23 and through which air, or other elastic fluid under pressure, can be introduced into the chamber 13 of the bellows and the reservoir 14 for establishing a predetermined initial pressure therein or for replenishing such pressure from time to time as may be desirable. The charging conduit 23 communicates with the chamber 13 and the reservoir 14 through the damping valve 15. A suitable pressure indicating gauge 24 can be provided on the charging conduit 23.

The damping valve 15 serves the important purpose of reducing or eliminating periodic oscillation in the movements of the vehicle portion 16 relative to the vehicle portion 17. This damping valve comprises a body or housing 25 having a passage 26 therein which forms a part of the communicating passage between the reservoir 14 and the chamber 13 of the bellows 12a. The valve 15 is here shown as being located at the upper end of the bellows 12a by being suitably secured against the plate member 18.

The damping valve 15 also comprises an orifice member 27 which is suitably mounted in the passage 26 of the valve housing 25 as by means of the threaded connection 28, and a valve member 29 axially movable in the orifice member 27. The valve member 29 is slidably mounted on the intermediate portion of a guide rod 30 which extends through the orifice member 27 coaxially thereof.

The orifice member 27 is a tubular member, preferably in the form of an insert, having an intermediate substantially circular throat portion 31 representing the minimum transverse dimension of the passage 32 of this orifice member. The orifice member 27 also has tapered passage portions 33 and 34 located on opposite sides of and immediately adjacent to the throat portion 31. These tapered portions 33 and 34 will be further described hereinafter, but at this point of the description it is sufficient to explain that these passage portions are tapered circular passage portions whose transverse dimension increases progressively in a direction away from the throat portion 31.

The valve member 29 is of a relatively lightweight construction preferably comprising a molded body of a suitable non-metallic plastic material although, if desired, it could be made of a suitable lightweight metal such as aluminum, magnesium, or the like. This valve member comprises a circular member having an annular rim portion 35 of a relatively reduced axial thickness in cooperating relation to the wall of the orifice member 27. In its initial or intermediate position the valve member 29 is disposed with its rim portion 35 in the throat portion 31 with a small annular clearance between such rim portion and the wall of such throat portion. While the valve member 29 remains in this initial position, communication between the reservoir 14 and the bellows chamber 13 is substantially closed. The valve member 29 is urged toward this initial position in the throat portion 31 of the orifice member 27 by a pair of compression springs 37 and 38 disposed around the guide rod 30 and engaging opposite sides of the valve member.

The guide rod 30 is mounted in an axial position in the valve housing 25 by having its lower end threadedly connected with a spider member 39. The spider member 39 also forms a seat for the lower end of the spring 38 and is here shown as being secured to the valve housing by the threaded connection 40. A downwardly projecting sleeve portion of the spider member 39 extends into the opening 41 of the plate 18 for connecting the lower end of the passage 26 in communicating relation with the bellows chamber 13.

The upper end of the guide rod 30 has a reduced stem portion 42 thereon which is received in a central axial opening 43 provided in the underside of the valve housing cover 44. A nut 45 threadedly mounted on the guide rod 30 forms an adjustable seat for the upper end of the spring 37. The valve springs 37 and 38 can be loaded sufficiently by adjustment of the nut 45 along the rod 30, such that the valve member 29 can be located in a desired initial position.

Downward movement of the vehicle portion 16 relative to the vehicle portion 17 produces a compression stroke of the bellows 12a during which the volume of the chamber 13 is decreased and air under pressure is forced through the damping valve 15 into the reservoir 14. During this compression stroke, the air pressure effective against the valve member 29 moves the same along the rod 30 in opposition to the resultant force of the combined action of the springs 37 and 38, thereby shifting the valve member out of the throat portion 31 and into the tapered control portion 33. This upward opening movement of the valve member 29 causes the rim portion 35 to define with the surrounding wall of the tapered control portion 33 an intervening annular valve opening through which the air pressure flows from the bellows chamber to the reservoir 14.

The area of this annular valve opening depends upon the extent of the linear axial movement of the valve member away from the throat portion 31 and the extent of this axial movement is, in turn, dependent upon the air pressure acting against the valve member during the compression stroke. The greater the extent of the opening axial movement of the valve member 29, the greater will be the area of the annular valve opening and the flow capacity for the displacement of air from the bellows chamber 13 into the reservoir 14.

During the rebound or expansion stroke, the expansion of the bellows 12a tends to produce a sub-normal pressure in the bellows chamber 13, resulting in a tendency for air to flow from the reservoir 14 into the bellows chamber. The pressure of the reservoir air against the valve member 29 shifts the same downwardly in opposition to the resultant force of the combined action of the springs 37 and 38, thereby moving the valve member out of the throat portion 31 into the tapered control portion 34.

When the valve member is thus moved into the control portion 34, the rim portion 35 of the valve member will define with the tapered wall of this control portion an intervening annular valve opening through which the air pressure flows from the reservoir into the bellows chamber. The area of this annular valve opening will be dependent on the extent of downward linear axial movement of the valve member 29 such that the greater the amount of such axial movement, the greater will be the area of such annular valve opening and the greater the rate of flow of air pressure from the reservoir into the bellows chamber.

The resistance which the valve member 29 thus offers to the transfer of pressure fluid between the bellows chamber 13 and the reservoir 14, produces a damping effect on the functioning of the air spring apparatus 10 such that periodic oscillation in the relative movements between the vehicle portions 16 and 17 will be substantially reduced or eliminated.

The drawings represent one example of the practical application of the air spring apparatus 10 to railway car use in which the shape of the control portion 33 is such in relation to the control portion 34, that the valve 15 has a greater flow restricting action during the compression stroke than during the expansion stroke. In this particular example the reservoir has a volume of approximately 4,000 cubic inches and the bellows chamber 13 has a volume of approximately 510 cubic inches for the normal or initial condition of the bellows. The pressure of the confined fluid of the bellows chamber and reservoir is 94.7 p. s. i. absolute and the mean effective cross-sectional area of the bellows is approximately 102 square inches. The preloaded valve springs 37 and 38 have a combined or resultant load effect on the valve member 29 equivalent to that of a spring rate of 10 pounds per inch.

The tapered shape and transverse dimension for the control portions 33 and 34 of the orifice member 27 can be determined either by calculation or experimentation. The manner of determining the tapered shape and transverse dimension for the control portion 33 by calculation for the particular example referred to above, is explained hereinafter.

Figs. 6, 7, and 8 are diagrams graphically illustrating structural and functional characteristics of air spring apparatus of the kind here under consideration. In the diagram of Fig. 6 the curve 47 is a load deflection curve plotted for an air spring apparatus comprising the bellows 12a and the reservoir 14, but with the damping valve 15 omitted. The curve 48 is a similar load deflection curve for the bellows 12a when the reservoir 14 and the damping valve 15 have both been omitted and the bellows chamber 13 is a closed chamber having the elastic pressure fluid confined therein. The curve 49 is a pressure vs. deflection curve plotted for an air spring apparatus comprising the bellows 12a and the reservoir 14 but without the damping valve 15, and the curve 50 is a pressure vs. deflection curve plotted for the bellows 12a as a closed chamber when the reservoir 14 and the damping valve 15 have both been omitted.

The performance of the air spring apparatus 10, which includes the reservoir 14 and the damping valve 15, would be represented by a pressure vs. deflection curve similar to the curves 49 and 50 but lying in the area 51 which is included between these curves. The included area 51 represents energy or work which is required to be absorbed or dissipated by the air spring apparatus in preventing periodic oscillation.

In the diagram of Fig. 6, distances along the vertical axis 52 are used to represent the height and vertical deflection of the bellows 12a in inches. The scale 52a along the left side of the vertical axis represents the actual height of the bellows under the applied load. The scale 52b along the right of the vertical axis represents bellows deflection with the portion of this scale extending above the horizontal axis 53 representing extension of the bellows and the portion of this scale extending below the horizontal axis representing compression of the bellows.

The horizontal axis 53 of Fig. 6 is at the zero point of the scale 52 and represents the height of the bellows 12a for its normal condition under a given load applied thereto. The scale 53a extending along the upper side of the horizontal axis 53 represents the value of the load in pounds being applied to the bellows 12a and the scale values 53b along the underside of the horizontal axis represent the pressure in p. s. i. of the fluid in the bellows.

Fig. 7 illustrates characteristics and functioning of the air spring apparatus 10 by means of the curves 54 and 55. The curve 54 represents pressure drop across the valve opening or orifice of the damping valve 15 and is obtained by plotting values of the velocity of the axial deflection of the bellows 12a against variations in the pressure of the fluid confined in the air spring apparatus 10. These velocity values in inches per second are laid off along the horizontal axis 56 and the values of pressure drop in p. s. i. are laid off along the vertical axis 57. The curve 55 represents the variable cross-sectional area of the passage portion 33 of the orifice member 27 and is obtained by plotting different values of such passage area along the vertical axis 57 as against the velocity of bellows deflection measured along the horizontal axis 56. The scale 58 represents the values of cross-sectional area of the orifice passage portion 33 in square inches.

In Fig. 8 the curve 59 represents the shape of the wall of the tapered control portion 33 of the orifice member 27. This curve is obtained by plotting values of the diameter of the control portion 33 along the vertical axis 60 against valve spring deflection for the valve member 29 measured along the horizontal axis 61. The values of valve spring deflection also represent linear distances of movement of the valve member 29 axially of the orifice passage, that is, along the control portion 33.

The tapered shape for the control portion 33 of the orifice member 27 can be determined by calculation with the assistance of the diagrams of Figs. 6, 7, and 8 and, as an example of the procedure for such calculation, the following description is given in which it is assumed that critical damping in the operation of the air spring apparatus 10 would be that amount of damping in which substantially no periodic oscillation would occur. Twenty percent of such critical damping is assumed to be a satisfactory condition of operation for the air spring apparatus 10 for all practical purposes. It is also assumed that the compression and expansion of the elastic fluid confined in the apparatus will be in accordance with a polytropic process defined by the equation:

(a) $$P_1 V_1^{1.35} = P_2 V_2^{1.35}$$

In this equation $P_1$ is the initial pressure of the confined fluid and $P_2$ is the pressure of the confined fluid corresponding with the loaded condition of the bellows 12a. $V_1$ and $V_2$ are the volumes of the confined fluid corresponding with such initial and loaded conditions of the bellows.

In Table I given hereunder, the values used in or obtained from the calculations employing the above Formula $a$ are listed in columns 1 to 5 inclusive.

Table I

| (1) | (2) | (3) | (4) | (5) Volume of bellows in Cubic Inches | (6) Load Lbs. | (7) Height Inches |
|---|---|---|---|---|---|---|
| $V_2$ | $V_1/V_2$ | $V_1/V_2^{1.35}$ | $P_2$ | | | |
| 4,010 | 1.115 | 1.158 | 109.7 | 310 | 12,300 | 3.1 |
| 4,110 | 1.091 | 1.1245 | 106.5 | 410 | 11,500 | 3.9 |
| 4,210 | 1.067 | 1.0915 | 103 | 510 | 10,800 | 4.60 |
| 4,310 | 1.042 | 1.05 | 98.7 | 610 | 10,000 | 5.50 |
| 4,410 | 1.021 | 1.02 | 96.7 | 710 | 9,000 | 6.35 |
| 4,510 | 1.000 | 1.000 | 94.7 | 810 | 8,200 | 7.30 (Normal position) |
| 4,610 | .98 | .975 | 92.5 | 910 | 7,000 | 8.40 |
| 4,710 | .96 | .9462 | 89.7 | 1,010 | 5,300 | 9.75 |
| 4,810 | .94 | .920 | 87.0 | 1,110 | 2,200 | 11.55 |

The values of $P_2$ given in column (4) of the above table are obtained from the calculations using Formula $a$ and represent the pressure of the confined fluid of the bellows 12a and reservoir 14 for the loaded condition of the air spring apparatus 10. The values of column (5) represent the volume of the bellows chamber 13 for the different values of applied load. The values of columns (6) and (7) are obtained from characteristic curves of the bellows 12a which are furnished by the manufacturer of this device. The values listed in Table I are used in plotting the curves 47, 48, 49 and 50 of Fig. 6.

The curves 47 and 48 of Fig. 6 show that the rate of the deflection of the bellows 12a of the air spring apparatus 10 is essentially constant over the desired working range and that natural frequency $f$ of the supported vehicle structure 16 in vertical motion will be represented by the following formula:

(b) $$f = \frac{1}{2\pi}\sqrt{\frac{Kg}{W}} = \frac{1}{2\pi}\sqrt{\frac{1110 \times 386}{8160}} = 1.158 \text{ cycles per second}$$

in which K is the spring constant in pounds per inch, $g$ is the acceleration due to gravity, and W is the weight of the load in pounds.

The critical damping coefficient for the air spring apparatus 10 is obtainable from the following formula:

(c) $$C_{cr} = 2\sqrt{\frac{KW}{g}} = 2\sqrt{\frac{1110 \times 8160}{386}} =$$

307 pounds per inch, per second in which K is the spring constant in pounds per inch, W is the weight of the load in pounds, $g$ is the acceleration due to gravity, and $C_{cr}$ is the critical damping coefficient and is obtainable in pounds per square inch, per second, and represents the energy needed to be absorbed or dissipated to completely dampen out all periodic oscillation. Since it has been assumed that twenty percent of such critical damping would be satisfactory for practical purposes, the following equation represents a determination of such percentage of the critical damping:

(d) $C.20 = .2 \times 307 = 61.4$ pounds per inch, per second

Since the bellows 12a has a mean cross-sectional area of 102 square inches, it will be seen that the change in the pressure of the confined fluid for this twenty percent of critical damping will be $61.4 \div 102 = .6$ pound per square inch, per inch, per second. If it is assumed that the maximum vertical acceleration of the vehicle structure 16 is $.15\,g$ at the above-mentioned 1.158 cycles per second, then the maximum velocity of the bellows deflection will be given by the following formula:

(e) $$V_{max} = \frac{accel.}{2\pi f} = \frac{.15 \times 386}{1.158 \times 6.28} = 7.96 \text{ inches per sec.}$$

in which $V_{max}$ is the maximum velocity of the bellows deflection, accel. is the maximum vertical acceleration of the vehicle structure, and $f$ is the frequency in cycles per second. If the amplitude through which this maximum velocity of bellows deflection is effective is 1.27 inches, then the pressure drop across the damping valve 15 would be $.6 \times 7.96 = 4.78$ pounds per square inch. With the above data, the cross-sectional area of the control portion 33 of the orifice member 27 can be calculated by the use of the following two formulae:

(f) $$V_o = \left(2gRT\left[\frac{P_1 - P_2}{P_1}\right]\right)^{1/2} \text{ feet per second}$$

(g) $$A_o = A_m = \frac{V_b}{V_o}$$

In the above formula (f) $V_o$ represents the velocity in foot seconds of the air through the orifice passage of the damping valve 15 required to produce the pressure resistance, $g$ is the acceleration due to gravity, R is a constant, T is the absolute temperature, and $P_1$ and $P_2$ are the air pressures in the bellows for the initial and loaded conditions thereof. In the Formula $g$ $A_o$ represents the cross-sectional area of the control portion 33 of the orifice passage; $A_m$ represents the mean cross-sectional area of the bellows 12a; $V_b$ is the velocity of bellows deflection and $V_o$ again is the velocity of the air through the orifice passage.

In Table II given hereunder, the results obtained from Formulae e, f, and g are tabulated. When the values for the area of the orifice passage have been thus obtained, the values for the variable diameter of the orifice passage can be readily calculated and the values and results for such calculation are given hereunder in Table III.

The curve 55 of Fig. 7 was plotted in accordance with these calculated values of the area of the orifice as represented in Table II, and in Fig. 8 the curve 59 was plotted with the calculated values of the orifice diameter as given in Table III.

Table II

| Accel. in g. Units | Ampl. for Accel. in g. Units | Max. Vel. of Bellows Deflection, in./sec. | For 20% Critical Damping | Air Vel. through Orifice Passage, ft./sec. | Area of Orifice Passage, sq. in. |
| --- | --- | --- | --- | --- | --- |
| .15 | 1.1 | 7.95 | 4.77 | 287 | .236 |
| .10 | .73 | 5.30 | 3.18 | 245 | .184 |
| .05 | .365 | 2.65 | 1.59 | 174 | .130 |

Table III

| Defl. of Valve Spring (Inches) | Pressure on Valve Member (Lbs./Sq. In.) | Area of Orifice Passage (Sq. In.) | Total Area of Passage (Sq. In.) | Diameter$^2$ of Valve Passage | Diameter of Valve Passage |
| --- | --- | --- | --- | --- | --- |
| .125 | 1.25 | .105 | 1.105 | 1.41 | 1.19 |
| .250 | 2.50 | .185 | 1.185 | 1.51 | 1.23 |
| .375 | 3.75 | .225 | 1.225 | 1.56 | 1.25 |
| .500 | 5 | .236 | 1.236 | 1.575 | 1.26 |

In the damping valve 15, the control passage portion 33 of the orifice member 27 is shown as having the curved taper represented by the curve 59 of Fig. 8, and the effectiveness of the damping valve during the compression stroke of the bellows 12a of the air spring apparatus 10 is in accordance with the cooperation of the valve member 29 with a side wall having this curved tapered shape in defining the above-mentioned annular valve opening. The control portion 34 of the orifice passage is shown as being a straight taper inasmuch as no damping action by the valve device 15 is needed during the expansion or rebound stroke and the flow through the damping valve at this time should be such as to permit a substantially undamped downward movement of the vehicle member 17 and a corresponding relatively free flow of pressure fluid back into the bellows chamber 13 from the reservoir 14.

Figure 1:
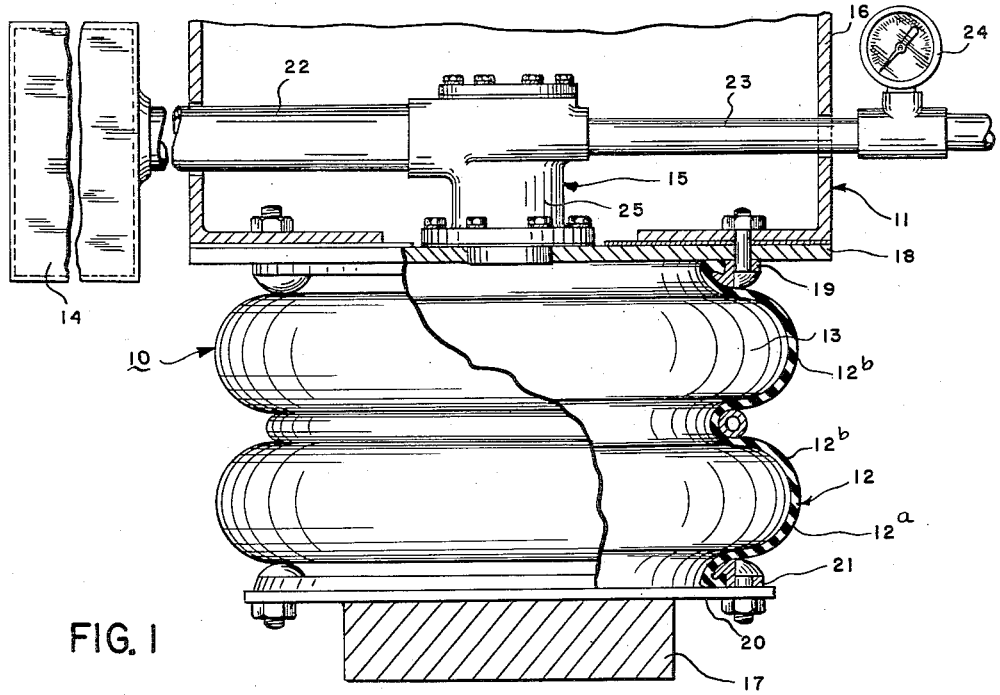
Fig. 1 is a view partially in vertical section showing air spring apparatus embodying the present invention and applied to vehicle structure.
Figure 2:
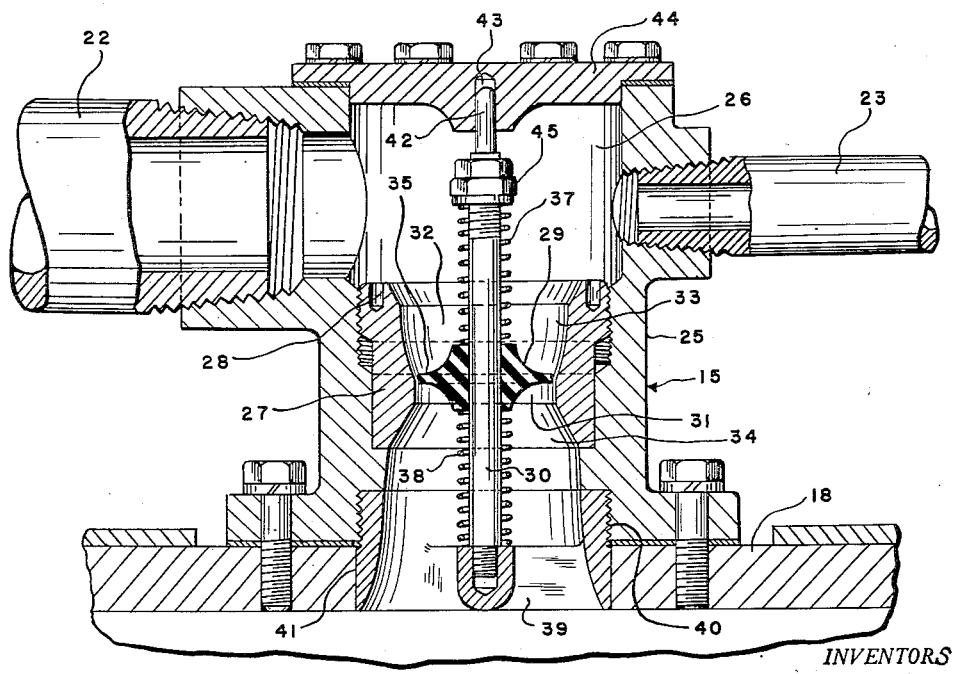
Fig. 2 is a vertical section taken through the damping valve means of the air spring apparatus.
Figures 3, 4, 5:
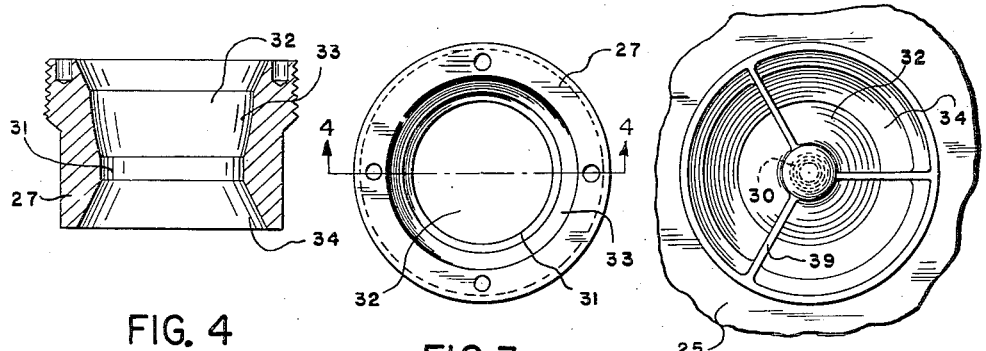
Fig. 3 is a plan view of the orifice member of the damping valve and showing such orifice member in detached relation.
Fig. 4 is an axial section taken through the orifice member as indicated by section line 4—4 of Fig. 3.
Fig. 5 is a partial bottom plan view of the damping valve.

If desired, however, the control portion 34 can have a curved taper similar to the taper of the control portion 33. Likewise, if desired, the orifice member 27 can be constructed with the tapers of the control portions 33 and 34 reversed from what is shown in Fig. 2, that is to say, with the control portion 33 having the straight taper for cooperation with the valve member 29 during the compression stroke of the bellows and the control portion 34 having the curved taper for cooperation with the valve member during the expansion stroke.

From the accompanying drawings and the foregoing detailed description, it will now be readily understood that this invention provides an air spring apparatus which embodies a damping valve means of such construction and of such operational characteristics that the air spring apparatus 10 will function smoothly and efficiently with a minimum amount of periodic oscillation.

Although the air spring apparatus of this invention has been illustrated and described herein to a somewhat detailed extent, it will be understood, of course, that the invention is not to be regarded as being limited correspondingly in scope, but includes all changes and modifications coming within the spirit of the invention and the scope of the claims hereof.

Having thus described our invention, we claim:

1. In air spring apparatus, a flexible bellows adapted to be subjected to load and having a chamber containing fluid under an initial pressure, a reservoir containing fluid under said initial pressure, means connecting said chamber with said reservoir for the transfer of pressure fluid therebetween including a passage portion having a throat section and an annular tapered section axially contiguous to the throat section and increasing in transverse dimension for increasing distances in an axial direction away from said throat section, a valve member in said passage portion and restricting said transfer of pressure fluid for producing an oscillation damping effect, and spring means urging said valve member toward a position of maximum flow restriction in said throat section, the wall of said annular tapered section being axially and circumferentially concave and said valve member being movable along said tapered section for increasing the flow capacity through said passage portion in response to the pressure of the fluid on said valve member such that said valve member is effective for damping periodic oscillations by absorption of energy substantially in proportion to the rate of the flexing movement of the bellows.

2. Air spring apparatus as defined in claim 1 in which said valve member has an initial position in said throat section to which it is movable by said spring means, and in which the movement of said valve member for increasing the flow capacity is in a direction away from said throat section and along said tapered section.

3. In air spring apparatus, a flexible bellows having a chamber containing fluid under pressure, a reservoir containing fluid under pressure, means defining a passage connecting said chamber with said reservoir for the transfer of pressure fluid therebetween, said passage having a throat portion of a substantially circular cross-section and tapered portions of a substantially circular cross-section on opposite sides of said throat portion and of progressively increasing diameter in a direction away from said throat portion, a substantially circular valve member in said passage and having an opening movement linearly of said passage and in a direction way from said throat portion in response to the pressure of said fluid against said valve member, and springs in said means engaging opposite sides of said valve member and urging the same toward an initial position in said throat portion, the wall of at least one of said tapered portions being axially and circumferentially concave and said valve member defining with said wall an annular valve opening having an effective area which is a function of the lineal displacement of said valve member relative to said throat portion such that said valve member is effective for damping periodic oscillations by absorption of energy substantially in proportion to the rate of the flexing movement of the bellows.

4. In air spring apparatus for resisting movement between relatively movable parts, a flexible bellows connected between said parts and defining a substantially closed variable-volume chamber, a substantially closed reservoir, said chamber and reservoir containing elastic fluid under pressure, means defining a passage of substantial cross-sectional area connecting said chamber and reservoir for an equalizing transfer of pressure fluid therebetween, flexing of said bellows in compression by relative movement between said parts being resisted by the resulting further compression of the fluid in said chamber and reservoir, a valve in said passage comprising relatively movable valve parts, one of said valve parts being a hollow insert having a substantially circular throat portion and the other valve part being a substantially circular valve member, and spring means urging said valve member toward a position of maximum flow restriction in said throat portion, said insert having an axially and circumferentially concave tapered annular wall defining a tapered passage portion contiguous to said throat portion and of increasing transverse dimension in an axial direction away from said throat portion, said valve member being movable along said tapered passage portion for increasing the flow capacity through said valve in response to the pressure of the fluid on said valve member such that said valve is effective for damping periodic oscillations by absorption of energy substantially in proportion to the rate of the flexing movement of the bellows:

5. Air spring apparatus as defined in claim 4 and which includes a guide rod substantially coaxial with said insert, and in which said spring means and said valve member are mounted on said rod, said valve member having a body portion slidable on said rod and an annular rim portion of relatively reduced axial thickness extending toward the wall of said insert.

References Cited in the file of this patent

UNITED STATES PATENTS

| | | |
|---|---|---|
| 1,087,890 | Rogers | Feb. 17, 1914 |
| 2,017,419 | Mercier | Oct. 15, 1935 |
| 2,352,351 | Thornhill | June 27, 1944 |
| 2,361,575 | Thompson | Oct. 31, 1944 |
| 2,713,498 | Brown | July 19, 1955 |

FOREIGN PATENTS

| | | |
|---|---|---|
| 171,055 | Great Britain | Nov. 10, 1921 |